United States Patent
Cappello et al.

(10) Patent No.: US 11,126,539 B2
(45) Date of Patent: Sep. 21, 2021

(54) DATA PROCESSING SYSTEM AND METHOD

(71) Applicant: Sony Interactive Entertainment Inc., Tokyo (JP)

(72) Inventors: Fabio Cappello, London (GB); Gregory James Bedwell, London (GB); Bernard Joseph Conry, Dublin (IE)

(73) Assignee: Sony Interactive Entertainment Inc., Tokyo (JP)

(*) Notice: Subject to any disclaimer, the term of this patent is extended or adjusted under 35 U.S.C. 154(b) by 1 day.

(21) Appl. No.: 16/661,149

(22) Filed: Oct. 23, 2019

(65) Prior Publication Data
US 2020/0151087 A1    May 14, 2020

(30) Foreign Application Priority Data
Nov. 9, 2018 (GB) .................................. 1818293

(51) Int. Cl.
| | |
|---|---|
| *G06F 11/36* | (2006.01) |
| *A63F 13/77* | (2014.01) |
| *G06N 20/00* | (2019.01) |
| *G06F 11/30* | (2006.01) |
| *G06F 11/34* | (2006.01) |
| *G06N 3/04* | (2006.01) |
| *G06N 3/08* | (2006.01) |

(52) U.S. Cl.
CPC .......... *G06F 11/3648* (2013.01); *A63F 13/77* (2014.09); *G06F 11/302* (2013.01); *G06F 11/3438* (2013.01); *G06F 11/3495* (2013.01); *G06F 11/3664* (2013.01); *G06F 11/3688* (2013.01); *G06N 20/00* (2019.01); *G06N 3/0454* (2013.01); *G06N 3/08* (2013.01)

(58) Field of Classification Search
CPC .......................... G06F 11/3648; A63F 13/77
USPC .................................................. 717/124–167
See application file for complete search history.

(56) References Cited

U.S. PATENT DOCUMENTS

| | | | | |
|---|---|---|---|---|
| 7,958,497 B1* | 6/2011 | Lindo | ................... | A63F 13/497 717/128 |
| 2007/0082741 A1* | 4/2007 | Xu | .......................... | A63F 13/10 463/43 |

(Continued)

OTHER PUBLICATIONS

Albaghajati, Aghyad Mohammad, and Moataz Aly Kamaleldin Ahmed. "Video Game Automated Testing Approaches: An Assessment Framework." IEEE Transactions on Games (2020).pp. 1-15 (Year: 2020).*

Perez, Ivan, and Henrik Nilsson. "Testing and debugging functional reactive programming." Proceedings of the ACM on Programming Languages 1.ICFP (2017): pp. 1-27. (Year: 2017).*

(Continued)

*Primary Examiner* — Satish Rampuria
(74) *Attorney, Agent, or Firm* — Matthew B. Dernier, Esq.

(57) ABSTRACT

A data processing system comprises an information input unit operable to receive information relating to computer gameplay of the computer game, an error characterising unit operable to identify indicators of an error in the computer game based upon the received information, a playtest control unit operable to control one or more playtest bots in the computer game to generate playtest data, the playtest data comprising information relating to the identified indicators of an error, an error reporting unit operable to identify errors in dependence upon the playtest data.

14 Claims, 3 Drawing Sheets

(56) References Cited

U.S. PATENT DOCUMENTS

| | | | | |
|---|---|---|---|---|
| 2009/0258699 A1* | 10/2009 | Lutnick | ............... | G07F 17/3244 463/25 |
| 2013/0263090 A1* | 10/2013 | Polk | .................... | G06F 11/3672 717/124 |
| 2015/0217198 A1* | 8/2015 | Curtis | ................. | G06F 11/3696 463/31 |
| 2016/0332081 A1 | 11/2016 | Marr | | |

OTHER PUBLICATIONS

Nantes, Alfredo, Ross Brown, and Frederic Maire. "A Framework for the Semi-Automatic Testing of Video Games." AIIDE. 2008.pp. 197-202 (Year: 2008).*

Virvou, Maria, George Katsionis, and Konstantinos Manos. "Combining software games with education: Evaluation of its educational effectiveness." Journal of Educational Technology & Society 8.2 (2005): pp. 54-65. (Year: 2005).*

Huang, Chung-Hao, et al. "A game-theoretic foundation for the maximum software resilience against dense errors." IEEE Transactions on Software Engineering 42.7 (2015): pp. 605-622. (Year: 2015).*

Royal, Jacob Jayakar, Shriram Kothapalli, and Siva K. Reddy Bora. "An empirical study on the factors influencing failure of software products in gaming related domains." 2019, pp. 1-5 (Year: 2019).*

Extended European Search Report for corresponding application No. EP19202507.0, 8 pages, dated Apr. 3, 2020.

Combined Search and Examination Report for corresponding application No. GB1818293.1, 5 pages, dated Apr. 29, 2019.

* cited by examiner

DATA PROCESSING SYSTEM AND METHOD

BACKGROUND OF THE INVENTION

Field of the Invention

This disclosure relates to data processing systems and methods.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In the early days of computing, computer games were typically linear computer games with a small number of possible interactions—a user was often expected to proceed along a predetermined path (or towards a goal in a particular manner) in which as the computer game progressed the difficulty increased. By providing a limited or linear computer gameplay progression, the playtesting process for a computer game developer was made rather simple—only a small amount of time was required for the developer to be able to explore a large proportion of the possible computer game states in order to find any bugs or glitches.

Examples of bugs and glitches include any undesirable performance of the computer game—for instance, drops in the number of frames per second that are displayed to the user would be identified as an issue in this regard. Other examples of bugs and glitches include miscolouring of elements, clipping errors, computer game crashes, and scenarios in which a player is unable to escape (such as being stuck behind an object).

Of course, as computer hardware has increased in power and availability over the years there has been a corresponding increase in the complexity and scope of computer games that have been developed. For example, there has been an increase in 'open-world' style computer games in which users are given a large map to explore that can take many hours to travel around completely even in the absence of in-game interactions (such as with in-game objects or characters). This leads to a much larger number of possible computer game states, which are often more diverse than those found in earlier computer games.

As a result of this increased complexity, the testing process to ensure that the final version is free of bugs (or at least functional to a high-enough level for release) has become much more challenging. In order for a computer game developer to be able to test even a fraction of the possible computer game states they would likely have to spend many years playing the computer game in order to discover, and subsequently fix, bugs present in the computer game.

It is therefore desirable to provide a method by which comprehensive, automated testing may be provided; this enables tests to be run at all times (that is to say continuously, without requiring the breaks that have to be provided to human testers), and a large number may be run in parallel, and as such even several years' worth of computer gameplay testing may be condensed into a short period of time. For example, the use of 10 automated testing systems running 20 hours a day for a week can perform the same amount of testing as a single person testing for 8 hours a day for almost half a year.

However, automated systems for performing a comprehensive, high-quality testing are not presently available, and as such only issues such as a drop in the number of frames per second output by a computer game or computer game crashes are able to be identified by automated playtesters. In addition to this, automated systems may simply adopt random paths through the in-game world. This means that some areas may be missed altogether, and areas which would require more extensive testing (such as those with more interactive elements) may not be sufficiently tested in such an arrangement.

It is therefore still necessary to invest a significant amount of human time into playtesting, so as to be able to find other types of bugs or glitches as well as to be able to ensure a sufficient coverage of the in-game world with testing.

It is in the context of the above problems that the present invention arises.

SUMMARY OF THE INVENTION

It is to be understood that both the foregoing general description of the invention and the following detailed description are exemplary, but are not restrictive, of the invention.

This disclosure is defined by claims 1 and 13.

Further respective aspects and features of the disclosure are defined in the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
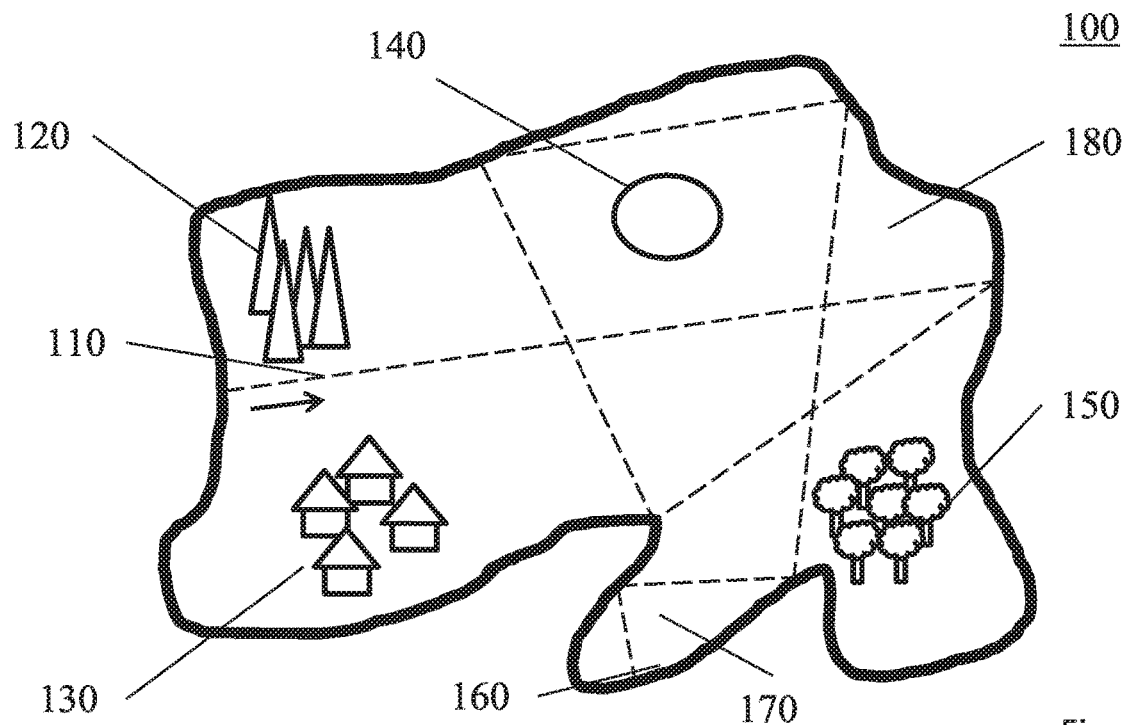
FIG. 1 schematically illustrates an in-game world map.

A schematic example of an in-game world maps is shown in FIG. 1, along with an example of a path taken by a playtester (automated or human) through the map.

The map 100 is a simplified view of an in-game world; for example, an island upon which the computer game's events take place that the player is able to explore freely. A number of exemplary environmental features are illustrated on the map 100—a mountain range 120, a village 130, a lake 140 and a forest 150. Of course, this example should not be seen as limiting—the methods discussed within this application may equally be applied to any virtual environment.

A path 110 is shown on the map 100 that illustrates an exemplary playtest route (with a direction of travel indicated by the arrow) that could be taken by a player or a playtest "bot" in an example in which when the bot reaches the edge of the map, a new direction is selected at random. In this application, a bot refers to a script that simulates a virtual player that may be used to interact with the in-game environment in the same manner as a player would be expected to.

Clear deficiencies with the path 110 are apparent from this image—the path easily misses all of the main features on the map 100, and instead traverses the (relatively) featureless parts of the map 100. Further to this, the end of the path 160 is in a narrow part 170 of the map 100 that may lead to the bot becoming trapped, due to narrow path back to the main area 180 of the map 100.

Figure 2:
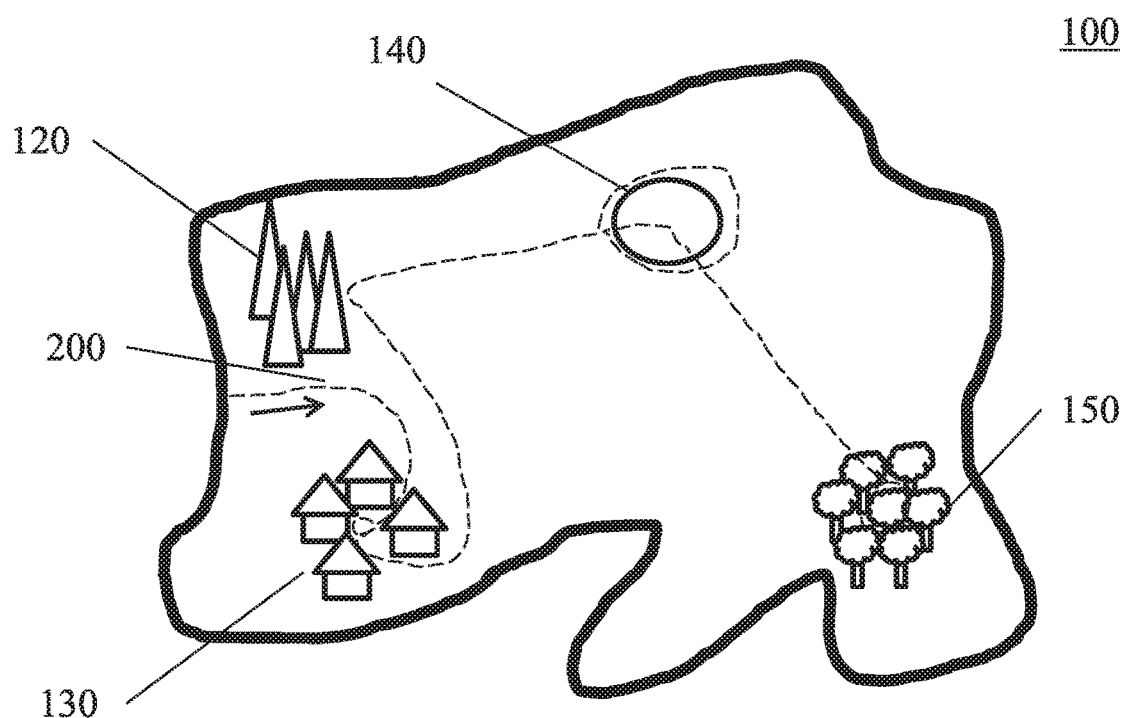
FIG. 2 schematically illustrates an in-game world map with an alternative path.

FIG. 2 schematically illustrates an example of an improved path 200 about the map 100. The path 200 immediately turns to inspect the village 130, as an area that is likely to include many interactions with objects and/or NPCs (Non-Player Characters). The path 200 then moves towards the mountain range 120, without entering the mountain range 120 as it may not be an area that a player is able/permitted to enter. The path 210 then approaches, circles, and passes through the lake 140 before leading to the forest 150. Such a path may be preset by an operator, for example, or may be determined in other ways (as is discussed below in more detail).

Figure 3:
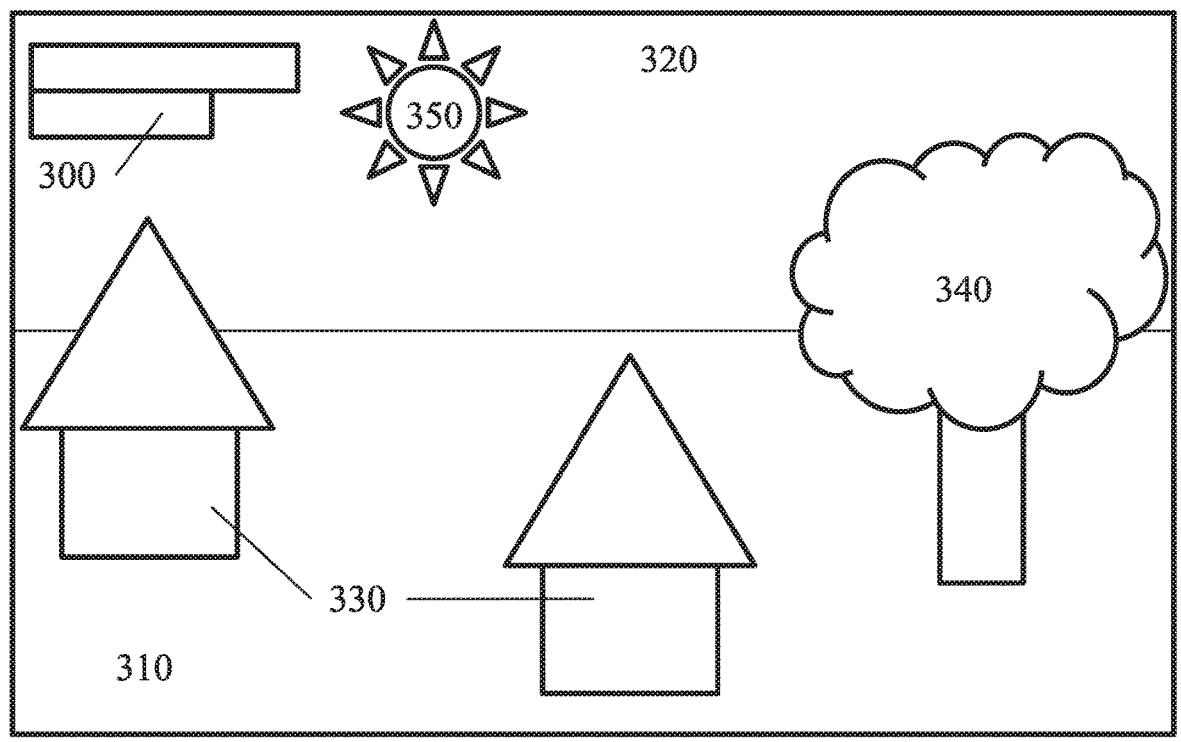
FIG. 3 schematically illustrates a first-person view of the in-game world.

FIG. 3 schematically illustrates a first-person view of a computer game that may be displayed to a player. Such an image may also be generated for a bot that is being used for playtesting; it is considered advantageous in some embodiments that the bot is operable to perform some form of image analysis in order to determine properties of the image, or objects within the image. A number of examples are provided below, although these should of course be regarded as being non-limiting.

The following examples centre largely on display issues—these are bugs or glitches that would be immediately apparent to a player that is viewing the content, but would not be apparent from computer gameplay statistics (unlike a frames-per-second count). As a result of this, traditional automated playtesting arrangements are not able to detect such visual errors.

The bars 300 represent an HUD (Heads-Up Display) that may be provided in order to communicate computer gameplay information (such as remaining health) to a player (whether a head mountable display (HMD), a hand-held display or a shared monitor screen is used). Visual errors that may be associated with this may be discolouration or an incorrect value being shown. Such errors may be detected based upon a comparison of visual data and computer game data (such as comparing the remaining health as logged by the computer game with the size of the displayed bars 300), or by detecting a change in the colour between frames.

The ground 310 is likely to occupy a large portion of any displayed image during computer gameplay, as is the sky 320. It would be expected that each of these would remain substantially constant in appearance from frame to frame, as would the ratio of each of these being displayed in the image. Of course, the display would change with a moving camera and/or viewpoint, but such a motion should take place over several frames and thus may be tracked. However, a significant deviation from one frame to the next (or any other suitable threshold) may be identified as being a display error. Examples of such errors include the ground disappearing, the sky changing colour, or the player falling into the ground.

The houses 330 are examples of objects which are expected to have a particular size and orientation—houses that are unexpectedly large or upside-down should be identified as being the results of a bug, for example.

The tree 340 may be considered in a similar manner, although of course trees may have a varying size, shape, and colour in order to provide visual variety for a player. The determining of visual errors in respect of a tree 340 (as an example of a model that may be reused with a number of different variations) may therefore be more complex, as common features between them may be identified and an acceptable range for different values (for example, having a particular leaf shape and boundaries on allowable colours and sizes).

The sun 350 represents an object that has a largely fixed position in the computer game (although the computer game may implement a particular day/night cycle that may modify this). Information about the position of the sun 350 may therefore be used to identify if the position deviates from the expected value. Other factors such as colour, shape, and size may also be considered.

While visual errors may be associated with a particular object, in some cases the non-display of an object may be considered to be a visual error. Of course, this may be difficult to detect—it is required that there is an indication that an element has not been displayed, or information about expected objects for a location to be available.

While it may be possible to define a set of parameters to be used by a bot in detecting visual errors, such a process may be time consuming and result in a bot that is only capable of detecting a small subset of possible errors. In many cases, it may therefore be preferable to implement machine learning or artificial intelligence (AI) based methods.

In order to successfully implement such a method, it is required to train an AI bot to identify errors. The training process may comprise any number of suitable learning inputs; for example, any one or more of the inputs described below may be used alone or in combination with other inputs.

An example of a first input is that of the raw computer game code and any assets (such as image textures) associated with the computer game. An analysis may be performed upon these elements in order to identify expected content. For example, colour information may be extracted from these elements so as to establish expected values for the computer game. This may assist in future error-spotting—for example, if a colour is displayed that does not appear in the code or textures, then this may be assumed to be the result of a glitch. Any other information may also be identified from these elements, rather than being limited only to colour information, for example size information for objects.

Training data may also be generated by a human (or other automated) playtester. For example, recorded video footage may be supplied to the AI in order to assist the bot in establishing what 'normal' computer gameplay (that is, computer gameplay that is free of glitches and bugs) should look like. Such video should either be free of bugs, or have the bugs highlighted, in order to assist the AI in determining the normal operation most effectively. The AI would then be equipped to identify deviations from normal computer gameplay, for example through using image processing methods or tracking computer gameplay statistics to identify the distinguishing features of abnormal computer gameplay.

Of course, such information may also be used to demonstrate particular bugs rather than only being indicative of normal computer gameplay; a mark-up of the video content may be required in order to identify the bug/glitch within the data.

Game information that is used as an input to the AI may also be useful for identifying context for objects, so as to assist in identifying when an object is out of place. For example, aquatic animals may be associated with the sea such that if they are detected elsewhere this is identified as an error even if the animal is displayed correctly. It may also be possible to identify other contextual errors, rather than just location-based ones, such as by associating particular groups of objects and/or events with one another (such as particular characters and weapons, or in-game times and events).

Information relating to the implementation of the computer game engine may also form a part of the input data for an automated playtester. For example, information about how particular glitches or bugs manifest (such as a common colour that appears in visual errors, common errors to be aware of, or particular scenarios in which errors arise) may be useful in training an AI bot in how to detect errors. For example, identifying 'not being able to move' as an error would be an easily recognisable error may be included—this would be useful in identifying pathing errors in which a user may become trapped behind objects or the like.

Such inputs can also assist the AI in establishing which content should be static and which should be dynamic. For example, the HUD 300 should be consistent between frames, and so the AI bot should be able to identify this as normal operation for that portion of the display.

After the release of a computer game, the amount of video content that is available increases exponentially. This is because it has become increasingly common to broadcast computer gameplay, either via a live stream or via a video hosting platform. Such videos may be used as inputs in a similar manner to those generated by playtesters pre-release; indeed, many videos are often uploaded to show visual glitches as they may have a high entertainment value and as such may be of particular value.

In some embodiments, image processing techniques may be utilised to track any of a number of different metrics. For example, the overall colour balance of an image may be monitored so as to identify any sudden changes that may be indicative of a visual error. This may be implemented in any suitable manner—for example, colours may be grouped into broader categories (such as primary colours, although a greater number of groups may be provided) and the overall makeup of these colours may be monitored relative to one another.

Alternatively, or in addition, the image processing may comprise object recognition techniques. This may enable the identification of more subtle display errors than those of incorrect colours, such as incorrect size/orientation of objects or incorrect models being displayed. As noted above, contextual errors may also be identified such as characters using the wrong weapons or animals appearing at the wrong times/locations.

Object recognition may also be suitable for determining when clipping errors and the like have occurred, such that objects are not displayed correctly. For example, it may be possible to identify that a character's arm is intersecting a solid wall, or that a person is falling into the floor.

As discussed above, the selection of an appropriate route for a playtest bot to take may be rather important.

The usefulness of the routes taken by bots may be gauged either on a per-bot basis, or on a per-group basis; that is, individual routes may not provide a comprehensive test on their own, but a group of bots using different routes may provide a comprehensive testing by selecting complementary playtesting routes (for example, routes that are each focused on a different area but together cover the whole map).

While a selection of suitable playtesting routes may be determined by a designer of the computer game, more effective routes may be identified using machine learning or AI methods. An example target of such a method may be a selection of routes that together offer a comprehensive coverage of the in-game environment while also providing a more complete testing in areas in which bugs are expected to (or do) arise. Examples of such areas include those in which a player is expected to spend more time and/or perform more interactions, and/or those for which bugs have already been reported.

The plotting of a route for a bot to take may also comprise more specific information about how the bot traverses the route. For example, the bot may be configured to run, walk or jump whilst travelling, and may be configured to perform a set number or type of interactions. For instance, a bot that runs and performs 50% of possible interactions on its path may explore significantly more of the virtual environment than a bot that walks and performs 70% of possible interactions on its path.

In some embodiments, it is considered that the bots may not have equal playtesting capabilities. For example, a first bot may be configured to identify when incorrect colours are displayed while a second bot may be configured to identify when objects are displayed with an incorrect size and/or orientation. This may decrease the time and processing requirements for each bot, for example, and enable the targeting of different bots to different areas in dependence upon the most likely bugs or glitches that would be expected to occur in those areas.

Training data that may be used to train the bots may include computer game data that is indicative of in-game events and interactions that may occur. For example, this information may include data about a density of player-interactable elements (such as objects or NPCs) in different areas of the in-game environment (which may be dependent on a computer game progression).

Interactions performed by a bot may comprise a number of different features. Examples of interactions may be that of picking up/using objects and talking to NPCs. Alternatively, or in addition, the interactions may be those such as climbing/jumping onto objects from different angles so as to simulate at least a portion of the possible actions that a player may perform. This may be useful in view of the fact that bugs may be triggered only under very specific circumstances, in some cases, and therefore testing of similar interactions under varying conditions may be required to identify bugs.

Further training data may comprise bot behavioural information that has been found to be effective at locating bugs previously—either in the same computer game environment, or a different computer game. In the same way that computer games of the same genre may have a number of transferable skills and similar controller inputs, the actions of a bot that may be used to locate bugs may be similar between computer games.

Earlier playtesting information, either generated by bots or by human playtesters, may be used to train a playtesting bot. For example, information about the occurrence of bugs and glitches that have already been identified may be utilised; this may be useful in identifying bug hotspots (that is, areas in which bugs occur most or interactions that generate a large number of bugs), bugs that do not need to be tested for (such that some tests may be omitted), and/or identifying indicators of bugs (such as particular colours that are displayed when an object is not displayed correctly).

Rather than being limited only to identifying visual bugs, other issues relating to the designing of a computer game may also be monitored. One example of such an issue is that of maintaining a particular difficulty curve throughout the progression of a computer game. In computer games, it is often desirable that the difficulty increases incrementally, such that the player is not overwhelmed at a particular point by a large increase in difficulty and is not left unchallenged by a computer game that does not increase in difficulty. It may therefore be appropriate to consider balancing issues (or an undesirable difficulty curve) as errors in the context of the present application.

When designing a computer game it can often be difficult to gauge the difficulty without playing the computer game thoroughly, and with the increasingly non-linear computer gameplay that is often provided in current computer games it is difficult to assess the difficulty even with a significant number of playthroughs. For example, it should be possible for a player to progress with any set of equipment or skillset (within reason) and it may require a significant amount of testing by a playtester in order to determine whether this is the case.

In a similar manner, the balance within a computer game may be considered; this generally refers to how viable a range of different options within the computer game are. For example, a computer game may be considered poorly balanced when a single, clearly optimal path (such as a set of items or skills to acquire, or a particular behaviour to adopt) exists that offers a disproportionately high chance of success. A computer game that is not well balanced may be less enjoyable than a well-balanced computer game as the amount of variety is reduced; most players will automatically adopt the most viable (that is, the strongest) strategy While a human playtester may be able to easily develop an idea of how difficult a computer game is, for example based upon their ease of success, this may be subjective and dependent upon factors such as user experience (a user who has played similar computer games may find the computer game easier, for example) and the path taken by the user through the computer game. It is difficult to perform an assessment of difficulty given computer game data alone (such as enemy damage figures), and as such actual playtesting may be required. Given these problems, and the extensive number of playtests that would be required throughout the development process, it would be useful to be able to include an assessment of a computer game's balance or difficulty in an automated playtesting arrangement.

In order to implement such a feature, an automated playtest bot is required to obtain information that can be used to identify a difficulty. For example, time taken to defeat an enemy, number of deaths, time taken to reach particular checkpoints (such as in-game events, or the end of the computer game), average damage-per-second of the playtest bot and/or enemies, or win rates of particular characters/playstyles/items. Of course, any other alternative or additional information that may be used as indicators of difficulty may also be collected.

The collection of such information may also be performed in a time-dependent manner, such that difficulty or balance at a particular time may be identified. This may be useful in implementing a desired difficulty curve throughout a computer game, for example. This may be measured in terms of raw computer gameplay time, or based upon which in-game milestones have been reached, for example.

Such a method may be advantageous in that a large number of playtest hours may be generated using 'players' (that is, playtest bots) that each share the same biases and abilities. By aggregating the results over a suitable number of playtests, it can be possible to identify difficulty levels throughout the computer game. Of course, a calibration may need to be performed in order to be able to relate the collected data to actual user experience—for example, human playtests and bot playtests may be carried out on the same version of a computer game, and then bot playtests are used to measure a variation in difficulty based on changes to the computer game (rather than measuring an absolute difficulty value).

To provide examples of how an AI system may be implemented to achieve the above effects, a number of examples are provided. Of course, these should not be taken as limiting; any suitable method may be used.

For example, Generative Adversarial Networks (GANs) may be used to train bots. The target in such a network may be the encountering of glitches, and this may be achieved by performing particular actions (the generated input). Glitch-causing actions may be identified from a training data set (as discussed above), and a discriminator may be operable to distinguish between training data and generated inputs based upon whether glitches are encountered. Examples of useful training data include videos of computer gameplay comprising glitches (such as speed runs of computer games, which often exploit glitches to skip parts of a computer game) or computer gameplay videos that do not comprise glitches; in the former, the GAN should be directed to emulate the behaviour patterns shown in the training data, while in the latter the GAN should be directed to emulate behavioural patterns that differ from the training data.

In this manner, it is possible to train a GAN to identify behavioural patterns for a bot that would be expected to generate glitches and bugs.

Supervised learning techniques could also be utilised for this purpose. For example, a pair of neural networks could be used in combination to identify bugs and identify behaviour that leads to the bugs. For example, a first neural network may be trained to identify bugs—the training may take any form described above; in some examples the errors in the video may be pre-labelled. A second neural network may then be used to identify behaviours that lead to the identified bugs. Once behaviours have been identified, they may be recreated by a bot.

Deep reinforcement learning provides a further option for developing a bot that is effective at generating and/or identifying bugs and glitches in content. Such methods rely on providing a 'reward' to a bot that is acting in an environment; of course this does not need to be a reward in the traditional sense, rather it is an acknowledgement that the actions of the bot have led to a positive outcome (that is, the generation/identification of a bug).

Figure 4:
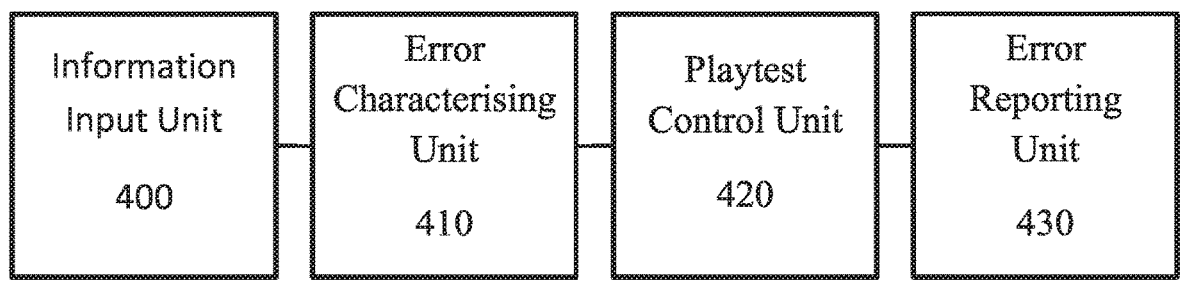
FIG. 4 schematically illustrates a data processing system as an example of an intelligent playtest system.

FIG. 4 schematically illustrates a data processing system (such as an intelligent playtest system), for example for generating playtest information for a computer game, the system comprising an information input unit 400, an error characterising unit 410, a playtest control unit 420, and an error reporting unit 430.

The information input unit 400 is operable to receive information relating to computer gameplay of the computer game; this data may be used as an input to the error characterising unit 410 and/or the playtest control unit 420, for example. For example, this information may include computer game code, visual/audio assets, earlier playtest data, video of computer gameplay, known bug detection methods, and/or computer game information.

The error characterising unit 410 is operable to identify indicators of an error in the computer game based upon the received information. The error characterising unit 410 is operable to identify indicators of errors including one or more of computer gameplay termination, visual errors, interaction errors, and/or audio errors. These errors may be identified in dependence upon teaching data provided to the error characterising unit 410, the teaching data comprising one or more of earlier playtest data, video of computer gameplay, known bug detection methods, and/or computer game information (for example). As discussed above, this may be implemented as an AI or machine learning based method.

The playtest control unit 420 is operable to control one or more playtest bots in the computer game to generate playtest data, the playtest data comprising information relating to the identified indicators of an error. The playtest control unit may be operable to cause one or more playtest bots to simulate interactions performed by human players of the computer game, to cause one or more playtest bots to simulate paths taken through the computer game by human players, and/or to cause playtest bots to perform a testing routine that represents a range of possible user interactions with a single in-game object. An example of the former is in determining a path that a user may take in a computer game, or a typical interaction set performed by a user. An example of the latter is that of identifying an in-game object (or the like) and performing a range of different interactions (such as pick up/throw/store/hit, or to approach/jump on the object from different angles and/or with different speeds) to include a set of interactions that is likely to be representative of a significant portion of the user base.

The playtest control unit 420 may be operable to use information about identified errors to determine actions to be performed by one or more of the playtest bots; for example, particular locations or interactions may be sought out as they are common sources of errors that may be experienced during computer gameplay. Alternatively, or in addition, the playtest control unit 420 is operable to control playtest bot behaviour in dependence upon computer game data indicating the number and/or type of interactions available to a user in a particular location in the computer game; this may be advantageous in that playtesting may be targeted towards areas/interactions in which it is likely that an error will occur (due to a high number of player interactions, for example).

In some embodiments, the playtest control unit is operable to record computer gameplay statistics relating to the actions performed one or more of the playtest bots; these can be any statistics about the computer gameplay experienced by the playtest bot, such as paths taken and interactions performed. In some embodiments, the computer gameplay statistics are indicative of computer gameplay progress and/or difficulty.

As noted above, the playtest control unit 420 may be operable to control playtest bot behaviour in dependence upon an AI or machine learning analysis of teaching data including data such as earlier playtest data, video of computer gameplay, known bug detection methods, and/or computer game information.

The error reporting unit 430 is operable to identify errors in dependence upon the playtest data.

In some embodiments, the system may also include an error correction unit (for example, formed as a part of the error reporting unit 430) operable to identify modifications to the computer game to reduce the occurrence and/or severity of the errors identified by the error reporting unit. This may be implemented by modifying computer game code or audio/visual assets, for example, so as to either reduce the impact of the error or to reduce the likelihood of the error occurring. For instance, objects may be moved within the computer game or changed in size/shape so as to improve user mobility within the computer game.

As discussed above, in some cases the identified errors may relate to the balancing of the computer game. In this case, the error reporting unit 430 may be operable to provide outputs indicating a difficulty progression throughout a computer game, and/or the error correction unit may be operable to modify statistics of different items or enemies within the computer game to adjust the difficulty. For example, if a computer game is seen as being too difficult at a particular stage, then enemies associated with that stage may be weakened and/or the user's statistics (and/or their items) may be strengthened.

Figure 5:
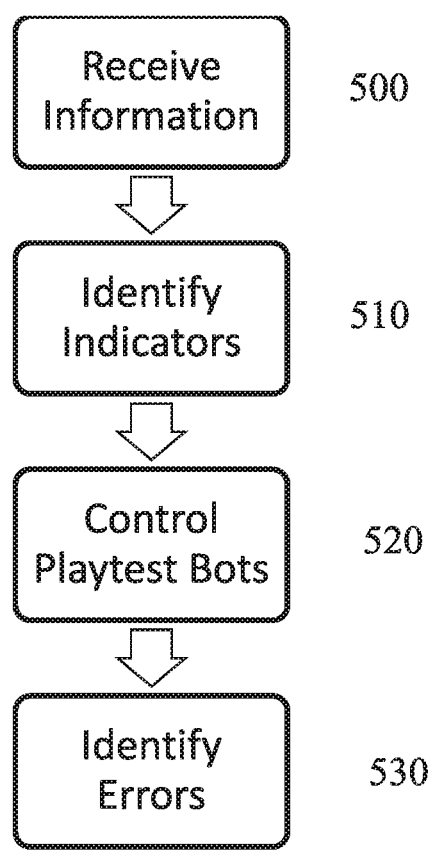
FIG. 5 schematically illustrates an intelligent playtest method.

FIG. 5 schematically illustrates a method, for example an intelligent playtest method for generating playtest information for a computer game.

A step 500 comprises receiving information relating to computer gameplay of the computer game.

A step 510 comprises identifying indicators of an error in the computer game based upon the received information.

A step 520 comprises controlling one or more playtest bots in the computer game to generate playtest data, the playtest data comprising information relating to the identified indicators of an error.

A step 530 comprises identifying errors in dependence upon the playtest data.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A data processing system comprising:
    a processor and a storage device;
    the processor executing an information input unit by executing software code stored in the storage device to receive information relating to computer gameplay of a computer game;
    the processor executing an error characterizing unit by executing software code stored in the storage device to identify indicators of an error in the computer game based upon the received information;
    the processor executing a playtest control unit by executing software code stored in the storage device to control one or more playtest bots in the computer game to generate playtest data for the computer game, the playtest data comprising information relating to the identified indicators of an error, where the one or more player bots simulate an actual player in order to exercise the game to produce the playtest data;

the processor executing an error reporting unit by executing software code stored in the storage device to identify errors in dependence upon the playtest data, wherein the error characterizing unit is to identify indicators of errors including one or more of visual errors, interaction errors, and/or audio errors.

2. The system according to claim 1, wherein the playtest control unit is to cause one or more playtest bots to simulate interactions performed by human players of the computer game.

3. The system according to claim 1, wherein the playtest control unit is to record computer gameplay statistics relating to the actions performed by one or more of the playtest bots.

4. The system according to claim 3, wherein the computer gameplay statistics are indicative of computer gameplay progress and/or difficulty.

5. The system according to claim 1, wherein the error characterizing unit is to identify indicators of errors including computer gameplay termination.

6. The system according to claim 1, wherein the playtest control unit is to use information about identified errors to determine actions to be performed by one or more of the playtest bots.

7. The system according to claim 1, wherein the playtest control unit is to cause playtest bots to perform a testing routine that represents a range of possible user interactions with a single in-game object.

8. The system according to claim 1, wherein the playtest control unit is to cause one or more playtest bots to simulate paths taken through the computer game by human players.

9. The system according to claim 1, wherein the playtest control unit is to control playtest bot behavior in dependence upon computer game data indicating the number and/or type of interactions available to a user in a particular location in the computer game.

10. The system according to claim 1, wherein the playtest control unit is to control playtest bot behavior in dependence upon analysis of teaching data.

11. The system according to claim 10, wherein the teaching data comprises one or more of earlier playtest data, video of computer gameplay, known bug detection methods, and/or computer game information.

12. The system according to claim 1, comprising an error correction unit to identify modifications to the computer game to reduce the occurrence and/or severity of the errors identified by the error reporting unit.

13. A method comprising:

receiving information relating to computer gameplay of a computer game;

identifying indicators of an error in the computer game based upon the received information;

controlling one or more playtest bots in the computer game to generate playtest data, the playtest data comprising information relating to the identified indicators of an error, where the one or more player bots simulate an actual player in order to exercise the game to produce the playtest data;

identifying errors in dependence upon the playtest data, wherein the identifying indicators of errors includes identifying one or more of visual errors, interaction errors, and/or audio errors.

14. A non-transitory computer-readable storage medium which stores computer software, which when executed by a computer, causes the computer to carry out actions, comprising:

receiving information relating to computer gameplay of a computer game;

identifying indicators of an error in the computer game based upon the received information;

controlling one or more playtest bots in the computer game to generate playtest data, the playtest data comprising information relating to the identified indicators of an error, where the one or more player bots simulate an actual player in order to exercise the game to produce the playtest data;

identifying errors in dependence upon the playtest data, wherein the identifying indicators of errors includes identifying one or more of visual errors, interaction errors, and/or audio errors.

\* \* \* \* \*